(Model.)
S. S. BLACK.
RAILWAY CAR SEAT.
No. 287,999. Patented Nov. 6, 1883.
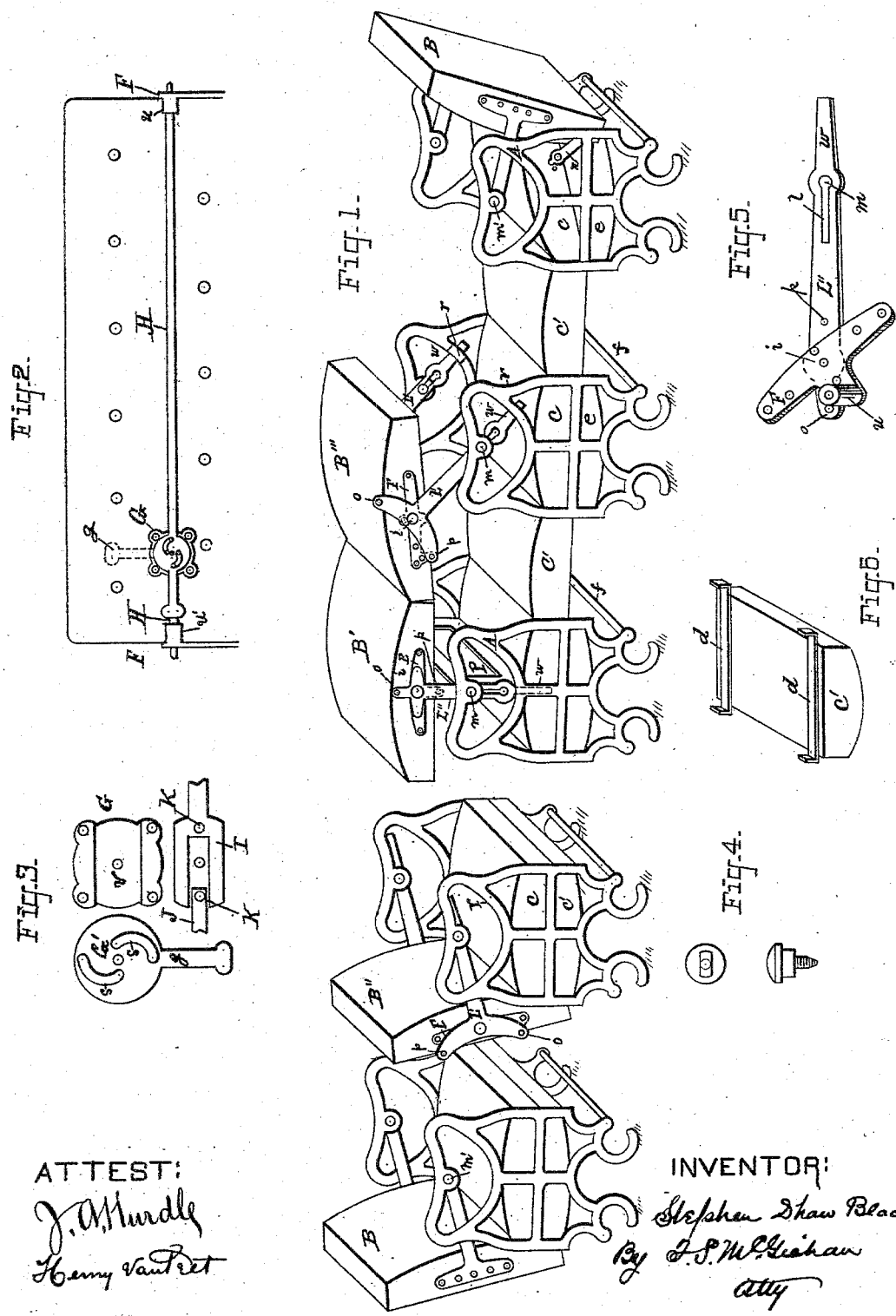
ATTEST:
J. A. Hurdle
Henry VanPet
INVENTOR:
Stephen Shaw Black
By J. S. McGiehan
Atty

UNITED STATES PATENT OFFICE.

STEPHEN SHAW BLACK, OF FREDERICTON, NEW BRUNSWICK, CANADA.

RAILWAY-CAR SEAT.

SPECIFICATION forming part of Letters Patent No. 287,999, dated November 6, 1883.

Application filed January 16, 1883. (Model.)

*To all whom it may concern:*

Be it known that I, STEPHEN SHAW BLACK, of Fredericton, in the county of York, Province of New Brunswick, Canada, have invented a new and useful Improvement in Car-Seats for Railway-Cars, of which the following is a specification.

This invention relates to that class of railway-car seats which can be readily converted into beds or sleeping-berths for night travelers.

The object of my invention therefore is to provide a simple mechanism by which the seats of a day passenger-coach can be speedily changed so as to convert it into a sleeping-coach. The mechanism by which I accomplish this result is fully illustrated in the accompanying drawings, in which—

Figure 1 shows one section consisting of five seats, part of which are arranged for sleeping purposes and part for day travel. Fig. 2 is a plan of seat-back B″ or B‴, showing the plane or uncushioned side with bolts and lock attached. Fig. 3 illustrates the lock in detail. Fig. 4 indicates the form of bolt used to attach the side bars of seat-backs to the seat-frames. Fig. 5 is a view of a side bar and fixture riveted together, showing that side which is in contact with the end of seat-back when secured to it. Fig. 6 shows means of holding upper cushion in position and supporting lower cushion.

The seat-backs in ordinary day passenger-coaches are of a concavo-convex form, and are provided with a side bar similar to that shown in Fig. 1 at L, which is directly attached by its cross-piece to the frame of the back, and by a rivet through its other extremity to the seat-frame A at $m'$. This form of back not being suitable for the purpose in view, I have adopted the form shown in the drawings, which is constructed in a manner precisely similar to that pursued in making the cushions—that is, a wooden frame-work provided with cross-slats to support spiral springs, over which a suitable covering is applied—and invented the form of side bar L′ and fixture F, Fig. 1, and L″ and fixture F, Fig. 5. This side bar differs from the ordinary one in this: A portion, $w$, is allowed to project across the center $m$, Fig. 1, a sufficient length to form a strong support when engaged in the socket on the inside of the frame at $r$. It is also provided with a slot, $l$, Fig. 5, which permits it to drop down on the bolt $m$ until the lower end is engaged in the socket at $r$. This side bar is attached to the fixture F by a rivet, $i$, Fig. 5. This fixture is secured to the frame of the back by screws. It is provided with a projection, $u$, Fig. 5, which projects inward across the back, as shown in Fig. 2 at $u'$. This projecting piece has the form of a hollow cylinder, and is intended to carry the outer end of bolt H, Fig. 2, in a secure and safe manner.

The side bar L′, Fig. 1, has a pair of horns projecting sidewise, through the outer extremities of which are holes $o$ and $p$. These holes are the same radial distance from the center $i$ as the hole through the projection $u$, Fig. 2; hence a bolt passing through the center of $u$ would pass through $o$ or $p$, as the case may be. These holes $o$ and $p$ are also so arranged in relation to the center $i$ and the outer side of backs B″ and B‴ that when the backs are rotated on their long axes passing through the centers $i$ and $i$, so as to bring either the soft side or hard side uppermost, the bolts H will, in passing into the holes $p$ and $p$, fix the backs at an angle of forty-five degrees (more or less) to the long axis of the side bars L′, which is the angle required by the backs B″ and B‴ when adjusted to form part of the upper sleeping-berth.

When the bolts H pass through the holes $o$ and $o$, the backs are secured (at right angles) to the long axes of the side bars L′, in which position they are fixed when used as day seats, as shown at B″, Fig. 1.

In the case of side bar L″, Fig. 5, the horns are dispensed with, and the holes $o$ and $p$ are in the line of the centers $i$ and $m$. This is the side bar used for back B′, and the holes are so arranged because the back in any case requires to be at right angles with the side bar, the reason for which is obvious on reference to the drawings, Fig. 1. This bar is provided with a longer slot than the others, for the reason that it is necessary for back B′ to drop down farther than the others on the bolts $m$, in order to make it correspond in height with B″ and B''', which are lowered by the angularity of their side bars L' and L'.

In Fig. 1, A indicates the seat-frame; B B' B'', &c., the backs, as already described, and C the seat-cushions; C', the under cushions, four of which are provided for each section, to fill the four interspaces between the five seat-cushions when needed. e is a pocket or receptacle, of canvas or other suitable material, hung to the seat cross-bars to receive and protect the under cushion from the feet of travelers by day. These cross-bars are made of metal, to economize space. f f f, &c., are the foot-rests. r r r, &c., are sockets on the inner side of frame to receive small end w of side bars, L L' L'', &c. P is a panel inserted for night use between the side bars L'' and L'', to separate the two lower berths from one another. B and B are backs provided with ordinary side bars, attached to frame A and A by rivets at m' and m'. n is a support to incline head-cushion of lower berth when desired. Metallic cleats d and d are attached to the under cushions, c' and c', Fig. 6, which grasps the cross-bars of seats when in use for berths, and the upper cushion when they are dropped into pocket e.

In Fig. 2 the locking device G, attached to the rotating backs, is shown. H and H are bolts; F and F, the fixtures; u and u, the projections of F and F, which carry the outer ends of bolts H and H. The inner extremities of bolts H and H are shown in Fig. 3. One is forked, as at I, and receives between its two parts the inner end of the opposing bolt, J. These are provided with fixed pins K and K, of sufficient length to project through the curved slots s and s' in the upper plate, G'. The forked bolt-head I is received in the depression v in the base of the lock G'', and the corresponding extremity, J, of the opposing bolt also, the disk-shaped cover G' being then secured in place by a rivet or bolt passing through its center and through the center of base G''. The curved slots or openings in cover G' approach the center by one extremity and the periphery by the other. A lever or handle, g, is provided, by which this cover can be rotated on its center.

It will be seen by this description that when the handle g is turned, the pins K and K being through the slots s and s, the bolts will travel outward or inward, as the case may be. When the lever g is in the position indicated in Fig. 2, the bolts are thrust outward, and, when desired, into the holes in side bar o and o or p and p, Fig. 1. When it is in the position indicated by the dotted line g', Fig. 2, the bolts are withdrawn and the back is free to rotate on its centers i and i. The outer end of lever g is slightly curved, so as to grasp the body of bolt H and be secured in that position.

Fig. 4 shows the form of bolt used to secure side bars of the backs which form upper berths to seat-frames. The flattened portion of the body next the head corresponds in thickness to the width of slot in the side bar L' or L''. The greater diameter of this portion corresponds to the diameter of hole at lower end of slot m in side bar L' or L''. This bolt is secured to the frame A in such a way that the sides of the flattened portion will be parallel to the long axis of side bar when its lower extremity w is directly opposite the socket r on inside of frame A, this socket being open at the bottom and placed in the same vertical plane in which side bar swings, and at such a place in the arc as to give the side bar the desired position.

It will be seen from this description that the side bars, with back attached, will swing freely around the center m, until the lower end of bar w is opposite socket at r, when it will drop into it unless supported by the hand until it is past that point.

The operation of this improvement is as follows: When it is desired to arrange the day seats as berths, the seat-cushions C C and C are removed. The under cushions, C' C' and C', are then placed between the seats, supported on the cross-bars by the cleats d and d, one being at either end of each lower cushion. The panel P is then removed from the pocket under the center seat of the section and adjusted between side bars L'' and L'', the back B' having been previously turned through half a revolution on the centers i i, bringing the cushioned side up. This back is then swung upward till its side bars are in a vertical position, when they drop into their sockets. This forms a safe and rigid support for the central portion of upper berth. The back, when swung up on the centers m and m, presents the lock G uppermost. The lever g is then turned, withdrawing bolts H and H, Fig. 2, as already described, which leaves the back free to be rotated on its centers i and i when it is turned soft side up. The hand is then thrust beneath the back and the lever g replaced, when everything is secure. C C, &c., are then replaced. After the backs B'' and B''' are adjusted for night use, it will be impossible for them to be removed from their position without first reversing them by bringing the cushion side undermost. This is due to the inclination of the side bars, and the fact that the centers i and i are nearer the outside margin of the back than the inside or cushioned surface, so that when the latter surface is turned upward the side bars could not be lifted from their sockets, as the back B'' or B''' would impinge against the edge of central back, B'.

The two outer backs, B'' and B''', have a slight inclination upward from the back B', as shown in Fig. 1, the object of which is to make the bed more comfortable, and at the same time to allow more room for the passengers occupying the lower berths. The backs B and B form head-boards to the lower berths, and the panel P a foot-board common to both. Curtains are provided to inclose the ends of upper berth.

Having thus fully described my invention, what I claim as new, and desire to secure by Letters Patent, is—

1. A mechanism consisting of the backs B', B", and B''', locks G, side bars L' and L", and frame A, having sockets and pivots for supporting the side bars L' and L", whereby the seats of a railway-car can be converted into berths for night travel by raising and securing in a horizontal position the backs of the seats, all as described and specified.

2. An improved car-seat back, provided with the lock G, constructed as herein described, and arranged to operate the bolts H and H, all as herein shown and specified.

3. An improved car-seat, consisting of the adjustable back B", having attached to it the fixture F, provided with projection $u$, and the side bar L', with slot $m$ and extended portion $w$, in combination with the bolts H H, lock G, and sockets $r\ r$ in seat-frame A.

4. The combination, with a railroad-car, of the improved seat, as herein described, consisting of the two cushions C and C', adjustable rotating back B', with side bars L" and L", movable panel P, bolts H and H, and lock G, and seat-frame A, provided with sockets $r$ and pocket $e$, suspended by metalic cross-bars, all as hereinbefore described, and for the purpose set forth.

In testimony that I claim the foregoing improvement in car-seats for railway-cars, as above described, I have hereunto set my hand.

STEPHEN SHAW BLACK.

Witnesses:
HAVELOCK COY,
KATE S. BLACK.